United States Patent
Nurmi (10) Patent No.: US 9,575,580 B2
(45) Date of Patent: Feb. 21, 2017

(54) MATRIX SENSOR NETWORK AND METHOD FOR SELECTING A GROUP OF ROWS AND READING COLUMNS OF THE MATRIX SENSOR NETWORK

(75) Inventor: Juha Harri-Pekka Nurmi, Salo (FI)

(73) Assignee: Nokia Technologies Oy, Espoo (FI)

(*) Notice: Subject to any disclaimer, the term of this patent is extended or adjusted under 35 U.S.C. 154(b) by 330 days.

(21) Appl. No.: 13/511,976

(22) PCT Filed: Nov. 30, 2009

(86) PCT No.: PCT/EP2009/066079
§ 371 (c)(1),
(2), (4) Date: May 24, 2012

(87) PCT Pub. No.: WO2011/063856
PCT Pub. Date: Jun. 3, 2011

(65) Prior Publication Data
US 2012/0274571 A1     Nov. 1, 2012

(51) Int. Cl.
G06F 3/02      (2006.01)
G09G 5/00      (2006.01)
G06F 3/041     (2006.01)

(52) U.S. Cl.
CPC ............ G06F 3/041 (2013.01); G06F 3/0416 (2013.01)

(58) Field of Classification Search
CPC .............................. G06F 3/041; G06F 3/0416
USPC .......................................... 345/156, 173–184
See application file for complete search history.

(56) References Cited

U.S. PATENT DOCUMENTS

| 7,038,820 B1* | 5/2006 | Kindt et al. .................. 358/474 |
| 2006/0132463 A1 | 6/2006 | Lee et al. |
| 2006/0262056 A1* | 11/2006 | Masutani et al. ............... 345/87 |
| 2008/0013005 A1* | 1/2008 | Deane ............................. 349/37 |
| 2008/0136801 A1 | 6/2008 | Shie |
| 2008/0218487 A1 | 9/2008 | Huang et al. |
| 2008/0252625 A1 | 10/2008 | Liao et al. |
| 2009/0251395 A1* | 10/2009 | Hu ........................ G06F 3/0416 345/87 |
| 2009/0251439 A1* | 10/2009 | Westerman et al. .......... 345/175 |

FOREIGN PATENT DOCUMENTS

| EP | 0731419 A2 | 9/1996 |
| EP | 1455264 A2 | 9/2004 |

(Continued)

OTHER PUBLICATIONS

International Search Report and Written Opinion received for corresponding Patent Cooperation Treaty Application No. PCT/EP2009/066079, dated Jul. 1, 2010, 17 pages.

*Primary Examiner* — Kumar Patel
*Assistant Examiner* — Insa Sadio
(74) *Attorney, Agent, or Firm* — Harrington & Smith (57) ABSTRACT

An apparatus comprising: a sensor network comprising: a first plurality of rows, a second plurality of columns and a third plurality of sensor elements wherein each sensor element is associated with a unique combination of a row and a column but not every unique combination of row and column is associated with a sensor; selection circuitry configured to concurrently select a group of the first plurality of rows; reading circuitry configured to concurrently read columns during a concurrent selection; and control circuitry configured to determine the group of the first plurality of rows that are concurrently selected.

19 Claims, 4 Drawing Sheets (56) References Cited

FOREIGN PATENT DOCUMENTS

| | | | |
|---|---|---|---|
| EP | 1988447 | A1 | 11/2008 |
| EP | 2075678 | A2 | 7/2009 |
| JP | 07-013543 | A | 1/1995 |
| WO | 2008/085719 | A2 | 7/2008 |
| WO | 2009/032304 | A1 | 3/2009 |

* cited by examiner

MATRIX SENSOR NETWORK AND METHOD FOR SELECTING A GROUP OF ROWS AND READING COLUMNS OF THE MATRIX SENSOR NETWORK

RELATED APPLICATION

This application was originally filed as PCT Application No. PCT/EP2009/066079 filed Nov. 30, 2009.

FIELD OF THE INVENTION

Embodiments of the present invention relate to a sensor and a method of using a sensor. In particular, embodiments of the present invention may relate to a sensor network and a method of using a sensor network.

BACKGROUND TO THE INVENTION

A matrix sensor network comprises sensor elements arranged on a grid or matrix. The grid or matrix comprises a plurality of row lines (rows) and a plurality of column lines (columns). Each sensor element is associated with a unique combination of a row and a column.

Typically a single row is selected and all the columns are read to detect a sensing event at any sensor associated with the selected row and any one of the columns. The matrix sensor network is scanned by sequentially selecting each row separately.

BRIEF DESCRIPTION OF VARIOUS EMBODIMENTS OF THE INVENTION

According to various, but not necessarily all, embodiments of the invention there is providedan apparatus comprising: a sensor network comprising: a first plurality of rows, a second plurality of columns and a third plurality of sensor elements wherein each sensor element is associated with a unique combination of a row and a column but not every unique combination of row and column is associated with a sensor; selection circuitry configured to concurrently select a group of the first plurality of rows; reading circuitry configured to concurrently read columns during a concurrent selection; and control circuitry configured to determine the group of the first plurality of rows that are concurrently selected.

According to various, but not necessarily all, embodiments of the invention there is provided a method comprising: concurrently selecting a group of rows in a matrix sensor; and simultaneously reading columns of the sensor network to detect a sensing event, wherein the concurrently selected group of rows are associated through sensing elements of the sensor network with different columns.

According to various, but not necessarily all, embodiments of the invention there is provided an apparatus comprising: a sensor network comprising: a first plurality of rows, a second plurality of columns and a third plurality of sensor elements wherein each sensor element is associated with a unique combination of a row and a column but not every unique combination of row and column is associated with a sensor; selection circuitry configured to concurrently select groups of the first plurality of rows according to predetermined patterns; and reading circuitry configured to concurrently read columns during a concurrent selection.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Some embodiments described below relate to an apparatus comprising: a sensor network 10 comprising: a first plurality of rows 22, a second plurality of columns 21 and a third plurality of sensor elements SW wherein each sensor element SW is associated with a unique combination of a row and a column but not every unique combination of row and column is associated with a sensor element; selection circuitry 24 configured to concurrently select a group of the first plurality of rows; reading circuitry 26 configured to concurrently read columns during a concurrent selection; and control circuitry configured to determine the group of the first plurality of rows that are concurrently selected.

The control circuitry may be configured to determine groups of rows such that the rows 22 are associated through sensing elements SW of the sensor network 10 with different columns 21.

The sensor network 10 therefore has a reduced number of sensor elements distributed over the sensor network 10 which results in faster detection of a sensing event.

Figure 1:
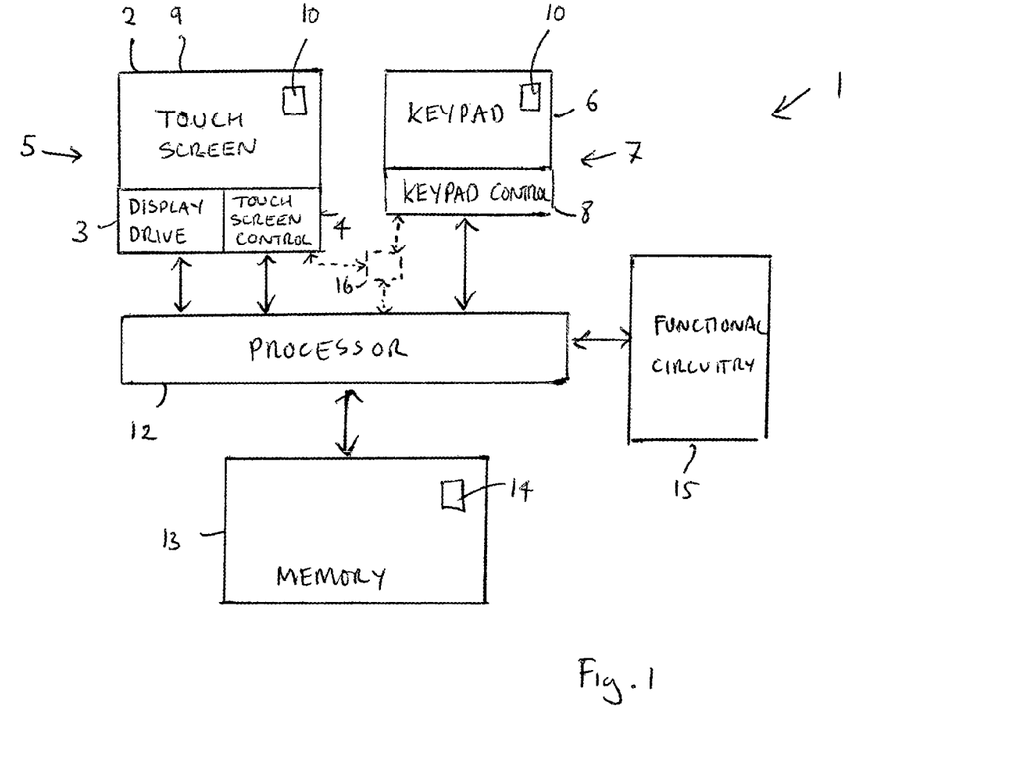
FIG. 1 schematically illustrates an apparatus.

FIG. 1 schematically illustrates an apparatus 1 comprising one or more sensor networks 10. A sensor network 10 may optionally be a part of a touch screen 2 or may optionally be part of a keypad 6. In the illustrated example, a first matrix sensor network 10 is a part of the touch screen 2 and a second matrix sensor network 10 is part of the keypad 6.

In the FIG. 1, a touch screen module 5 comprises: a touch screen 2 that includes a matrix sensor network 10 and a touch screen controller 4 for controlling the touch screen 2 as an input device. It may also comprise a display driver 3 for controlling a display panel 9 as an output device. The touch screen 2 may be a display integrated touch screen. The touch screen controller 4 may be implemented entirely in hardware or alternatively implemented using a combination of hardware and software.

In the FIG. 1, a keypad module 7 comprises: a keypad 6 that includes a matrix sensor network 10; and a keypad controller 8 for controlling the keypad 6 as an input device. The keypad controller 8 may be implemented entirely in hardware or alternatively implemented using a combination of hardware and software.

A processor 12 is connected to the touch screen module 5, the keypad module 7, a memory 13 and functional circuitry 15. The memory 13 stores a computer program 14. The processor 12 is configured to read from and write to the memory 13.

The functional circuitry 15 represents circuitry that performs functions that are ancillary to the control of the matrix sensor network 10 but which provide functionality to the apparatus 1.

Control circuitry for the intelligent control of a matrix sensor network 10 in the touch screen 2 may be provided within the touch screen controller 4 and/or the processor 12 under the control of the computer program 14.

Control circuitry for the intelligent control of a matrix sensor network 10 in the keypad 6 may be provided by the keypad controller 8 and/or the processor 12 under the control of the computer program 14.

Any such control circuitry provided by the processor 12 under the control of the computer program 14 may, instead, be integrated into an optional control module 16. The control module 16 may be implemented entirely in hardware or alternatively implemented using a combination of hardware and software. The term 'apparatus' may refer to the apparatus 1 or any sub-component of the apparatus 1.

The memory 13 stores a computer program 14 comprising computer program instructions that control the operation of the apparatus 1 when loaded into the processor 12. The computer program instructions 14 provide the logic and routines that enables the apparatus to perform the methods described below and/or illustrated in the Figures. The processor 12 by reading the memory 13 is able to load and execute the computer program 14.

Figure 2:
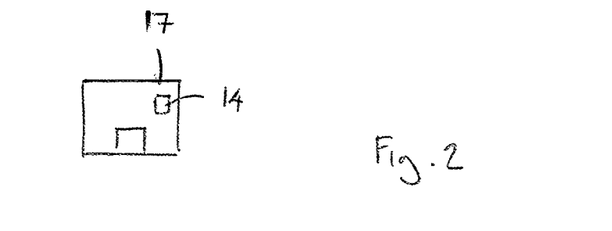
FIG. 2 schematically illustrates a record carrier.

The computer program 14 may arrive at the apparatus 1 via any suitable delivery mechanism 17 such as illustrated in FIG. 2. The delivery mechanism 17 may be, for example, a computer-readable storage medium, a computer program product, a memory device, a record medium, an article of manufacture that tangibly embodies the computer program 14. The delivery mechanism may be a signal configured to reliably transfer the computer program 14. The apparatus 1 may propagate or transmit the computer program 14 as a computer data signal.

Although the memory 13 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 3:
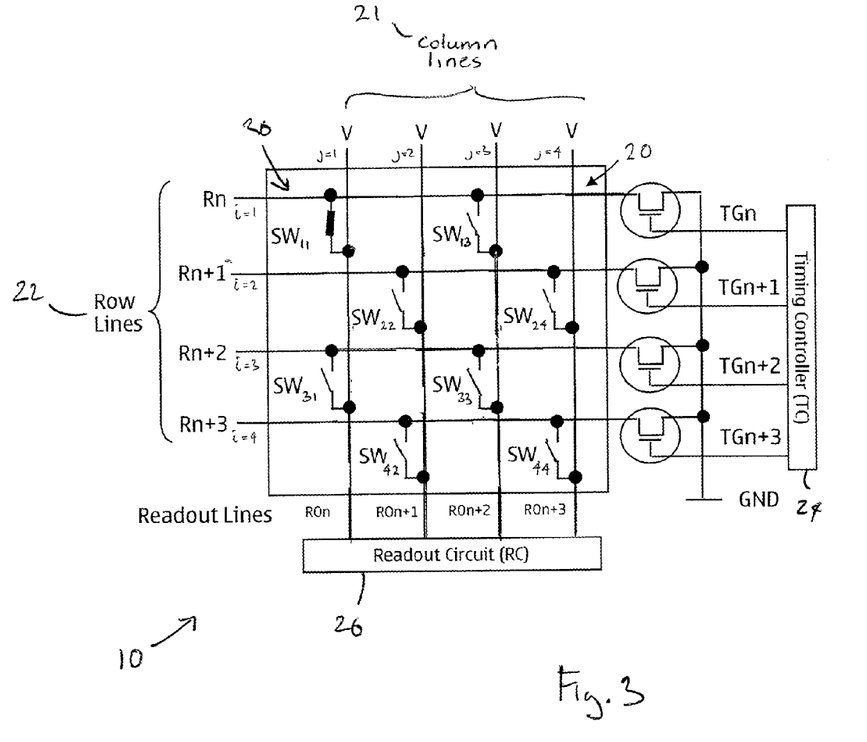
FIG. 3 schematically illustrates a matrix sensor network.

FIG. 3 schematically illustrates a matrix sensor network 10. This example of a sensor network 10 comprises sensor elements SW arranged on a grid or matrix 20. The grid or matrix 20 comprises a first plurality of row lines (rows) 22 and a second plurality of column lines (columns) 21. Each sensor element SW is associated with a unique combination of a row 22 and a column 21 but each unique combination of a row 22 and a column 21 does not have an associated sensor element SW. In this example, the rows 22 are orthogonal to the columns 21.

A timing controller block 24 operates as selection circuitry and is configured to concurrently select a group of the first plurality of rows. The group may contain multiple rows.

Control circuitry (not separately illustrated in FIG. 3) is configured to determine the groups of rows such that the rows 22 are associated through sensing elements SW of the matrix sensor network 10 with different columns 21. The control circuitry may be part of the timing controller block 24 or separate to it.

A reading block 26 operates as reading circuitry to detect a sensing event. The reading circuitry is configured to concurrently read the second plurality of columns 21 during a simultaneous concurrent selection.

If a sensing event is occurring at a sensor element SW and the row 22 associated with that sensing element SW is selected, then the column 21 associated with that sensing element SW will indicate a sensing event that is detected by the reading block 26. A co-ordinate of a sensing event is identified by the row and column of the sensing event.

In order to avoid ambiguous output, sensing elements SW associated with rows that are concurrently selected as a group are not associated with the same columns. Sensing elements SW associated with the same column are not be concurrently selected. If, however, sensing elements SW associated with the same column are concurrently selected then further steps would be required to disambiguate which of the sensing elements SW associated with a column has actually recorded a sensing event.

There is typically a minimum signal time required for an accurate read. Consequently, the timing controller 24 concurrently selects a different group of the first plurality of rows in a series of separate time slots which have a certain minimum duration.

In this application the term 'row' is used to signify a line that is selected to obtain a read-out from a sensor element. The term 'column' is used to signify a line that is used to obtain a read-out from a sensor element. It is does not necessarily imply any orientation to the horizontal or vertical.

Figure 5:
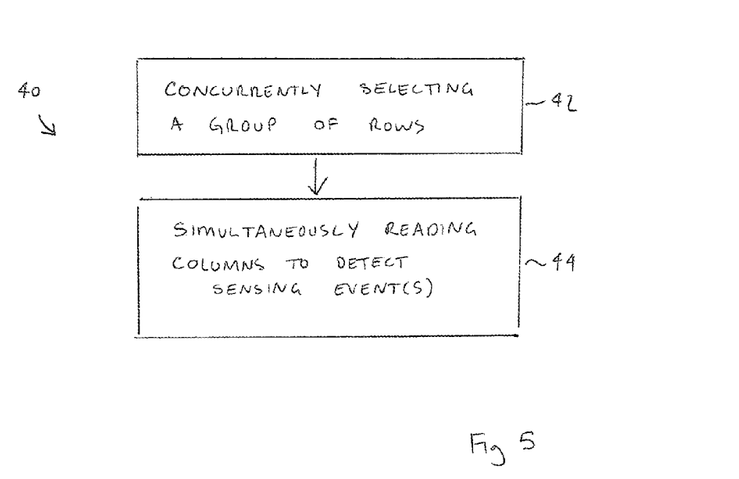
FIG. 5 schematically illustrates a method.

FIG. 5 schematically illustrates a method 40.

At block 42, a group of rows in the matrix sensor network are concurrently selected.

Typically, the rows in the group are associated through sensing elements SW of the matrix sensor network 10 with different columns 21. Sensing elements SW associated with the same column are not found in a group of rows for concurrent selection.

At block 44, the columns of the matrix sensor network are simultaneously read to detect a sensing event.

Figure 4A:
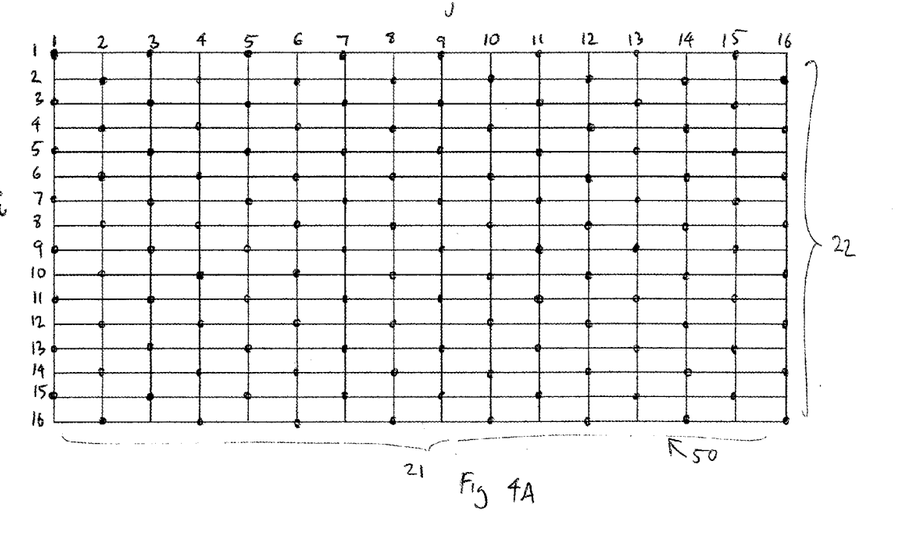
FIGS. 4A to 4C schematically illustrate different configurations of sensor elements in a matrix sensor network.
Figure 4B:
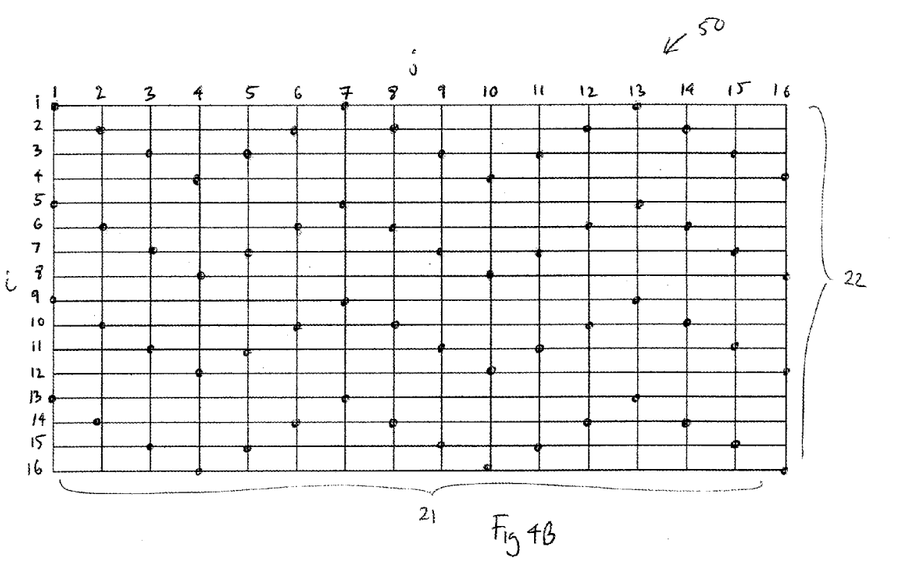
Figure 4C:
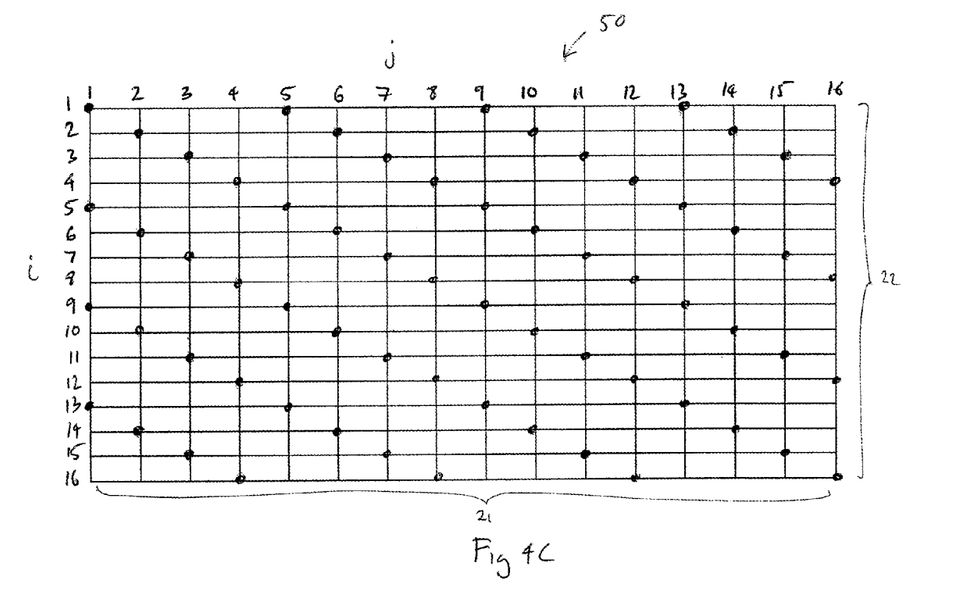

FIGS. 4A, 4B and 4C schematically illustrate different configurations of sensor elements. Each figure comprises a plurality of rows 22 and a plurality of columns 21. The overlapping rows and columns forms a matrix or grid 50. The presence of a sensor element at the intersection of a particular row and column is indicated by a large solid black dot. The absence of a large solid black dot at the intersection of a row and column indicates that a sensor element is not associated with that combination of row and column.

In the illustrated examples, there are 16 rows and 16 columns with 256 intersections. This is of course an example only and there may be different numbers of rows and/or columns in other embodiments.

In the illustrated example, the sensor elements are distributed such that, for each column, the sensors have a periodicity of N rows. That is the rows with sensors are separated by N−1 rows without sensors. N also represents the number of rows in a group of concurrently selected rows. In FIG. 4A, N=2. In FIGS. 4B and 4C, N=4.

The sensor elements are distributed substantially evenly over the grid or matrix 50 formed by the rows and columns.

Each row 22 is referenced with a unique index i which increases by one for each successive row. In the Figures, i ranges from 1 to 16.

Each column is referenced with a unique index j which increases by one for each successive column. In the Figures, j ranges from 1 to 16.

A sensor element is positioned at a row indexed by [N*m+offset(j)] modulo M where M is the number of rows, N is the periodicity of the sensors within the columns and where m=0, 1, 2, 3 . . . . (M/N)−1. For each group of N adjacent rows, the offsets(j) have N different values for [offset(j)] modulo N.

In FIG. 4A, M=16, N=2 and offset(j)=j.
For column 1 (j=1), there are sensors at rows: 1, 3, 5, 7, 9, 11, 13, 15 (for m=0, 1, 2, 3, 4, 5, 6, 7)
For column 2 (j=2), there are sensors at rows: 2, 4, 6, 8, 10, 12, 14, 16 (for m=0, 1, 2, 3, 4, 5, 6, 7)
For column 3 (j=3), there are sensors at rows: 3, 5, 7, 9, 11, 13, 15, 1 (for m=0, 1, 2, 3, 4, 5, 6, 7) etc For each group of 2 adjacent rows, the offsets(j) have 2 different values for [offset(j)] modulo N. In this case [j] modulo 2 is either 1 or 0.

The sensor elements are distributed such that, for each row the columns with sensors are separated by a regular number of columns without sensors.

The rows are concurrently selected in groups of two. A series of concurrent selections is used to select all the rows. The series may be represented as a list of couplets, where each couplet is associated with a concurrent selection of a particular time slot. Each couplet has the indexes i of the pairs of rows that are concurrently selected in that couplet's time slot.

One series of concurrent selections may be:
(1,2), (3, 4), (5, 6), (7, 8), (9, 10), (11, 12), (13, 14), (15, 16)

A second series of concurrent selection may be:
(1, 16), (3, 14), (5, 12), (7, 10), (9, 8), (11, 6), (13, 4), (15, 2)

When this second series of concurrent selections is used, different pairs of rows are concurrently selected in series. The series for one row in the pair is defined by a first series of rows (first index in a couplet) that starts with the first row (row 1) and ends with the last but one row (row 15). The series for the other row in the pair is defined by a second series of rows (second index in a couplet) that starts with the last row (row 16) and ends with the second row (row 2).

When this second series of concurrent selections is used, the concurrently selected rows have separations between them that vary with each successive concurrent selection in a series of concurrent selections. The separation may be found by subtracting the first index of a couplet from the second index of the same couplet.

In FIG. 4B, M=16, N=4, offset is periodically repeats 1, 2, 3, 4, 3, 2,
For column 1 (j=1), offset=1, there are sensors at rows: 1, 5, 9, 13, (for m=0, 1, 2, 3)
For column 2 (j=2), offset=2, there are sensors at rows: 2, 6, 10, 14 (for m=0, 1, 2, 3)
For column 3 (j=3), offset=3, there are sensors at rows: 3, 7, 11, 15 (for m=0, 1, 2, 3)
For column 4 (j=4), offset=4, there are sensors at rows: 4, 8, 12, 16 (for m=0, 1, 2, 3)
For column 5 (j=5), offset=3, there are sensors at rows: 3, 7, 11, 15 (for m=0, 1, 2, 3)
For column 6 (j=5), offset=2, there are sensors at rows: 2, 6, 10, 14 (for m=0, 1, 2, 3) etc For each group of 4 adjacent rows, the offsets(j) have 4 different values for [offset(j)] modulo N.

The sensor elements are distributed such that, for each row the columns with sensors are separated by a regularly variable number of columns without sensors. The separation for rows 1, 5 . . . is regular at 5. The separation for rows 2, 6 . . . is 3, then 1, then 3, then 1 . . . The separation for rows 3, 7 . . . is 1, then 3, then 1, then 3 . . . The separation for rows 4, 8, . . . is regular at 5.

The rows are concurrently selected in groups of four. A series of concurrent selections is used to select all the rows. The series may be represented as a list of quartets, where each quartet is associated with a concurrent selection of a particular time slot. Each quartet has the indexes i of one of the 4 rows that are concurrently selected in that quartet's time slot.

One series of concurrent selections may be:
(1, 2, 3, 4), (5, 6, 7, 8), (9, 10, 11, 12), (13, 14, 15, 16)

Another series of concurrent selections may be:
(1, 6, 11, 16), (5, 10, 7, 12), (9, 14, 3, 8), (13, 2, 15, 4)

A further series of concurrent selections may be:
(1, 2, 15, 16), (5, 6, 11, 12), (9, 10, 7, 8), (13, 14, 3, 4)

When the second and third series of concurrent selections is used, the concurrently selected rows have separations between them that vary with each successive concurrent selection in a series of concurrent selections. The separation may be found by subtracting pairs of indexes of a quartet.

In FIG. 4C, M=16, N=4, offset(j)=j
For column 1 (j=1), offset=1, there are sensors at rows: 1, 5, 9, 13, (for m=0, 1, 2, 3)
For column 2 (j=2), offset=2, there are sensors at rows: 2, 6, 10, 14 (for m=0, 1, 2, 3)
For column 3 (j=3), offset=3, there are sensors at rows: 3, 7, 11, 15 (for m=0, 1, 2, 3)
For column 4 (j=4), offset=4, there are sensors at rows: 4, 8, 12, 16 (for m=0, 1, 2, 3)
For column 5 (j=5), offset=5, there are sensors at rows: 5, 9, 13, 1 (for m=0, 1, 2, 3)
For column 6 (j=6), offset=6, there are sensors at rows: 6, 10, 14, 2 (for m=0, 1, 2, 3)
etc For each group of 4 adjacent rows, the offsets(j) have 4 different values for [offset(j)] modulo N.

The sensor elements are distributed such that, for each row the columns with sensors are separated by three columns without sensors.

The rows are concurrently selected in groups of four. A series of concurrent selections is used to select all the rows. The series may be represented as a list of quartets, where each quartet is associated with a concurrent selection of a particular time slot. Each quartet has the indexes i of one of the 4 rows that are concurrently selected in that quartet's time slot.

One series of concurrent selections may be:
(1, 2, 3, 4), (5, 6, 7, 8), (9, 10, 11, 12), (13, 14, 15, 16)

Another series of concurrent selections may be:
(1, 6, 11, 16), (5, 10, 7, 12), (9, 14, 3, 8), (13, 2, 15, 4)

A further series of concurrent selections may be:
(1, 2, 15, 16), (5, 6, 11, 12), (9, 10, 7, 8), (13, 14, 3, 4)

When the second and third series of concurrent selections is used, the concurrently selected rows have separations between them that vary with each successive concurrent selection in a series of concurrent selections. The separation may be found by subtracting pairs of indexes of a quartet.

Referring to FIGS. 4A to 4C, it is noted that each sensor element is offset one row and one column from at least one other sensor element. Two corner sensor elements are offset from only one sensor element by one row and one column. Edge sensor elements are offset from each of only two sensor elements by one row and one column. The other sensor elements are offset from each of at least two sensor elements by one row and one column. For each sensor element, the next closest sensor element is one row and one column distant.

Referring back to FIGS. 4A to 4C, if the matrix sensor network 10 is part of an integrated touch screen, then there may also be additional rows and columns for the pixels of the display. The density of pixels may be N times greater than the density of sensing elements. There may, for example, be a pixel element for each intersection of the rows 22 and columns 21 of the matrix sensor network 10. A pixel element may be a Red, Green, Blue pixel element or similar. The touch screen may use any suitable technology for a sensing element. It may, for example, be resistive, optical or capacitive.

As used here 'module' refers to a unit or apparatus that excludes certain parts/components that would be added by an end manufacturer or a user.

The blocks illustrated in the Figs may represent steps in a method and/or sections of code in the computer program. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. An apparatus comprising:
a sensor network comprising: a plurality of rows, a plurality of columns and a plurality of sensor elements, wherein each sensor element is associated with a unique combination of a row and a column but not every unique combination of row and column is associated with a sensor;
at least one processor;
memory storing a program of instructions;
wherein the memory storing the program of instructions is configured to cause the apparatus to at least:
from an available array of elements of the sensor network, wherein the available array includes at least one column in which two or more sensors are disposed in different rows, specify two or more rows to be concurrently selected, wherein the specification of two or more rows comprises specifying the rows of sensors such that no column in the sensor network includes two or more sensors belonging to the specified rows of sensors;
concurrently select the specified rows; and
read the columns during a comment selection of rows so as to detect sensing events at sensors disposed in the selected rows.

2. The apparatus of claim 1, wherein the sensor elements are distributed such that, for each column the rows with sensors are separated by a regular number of rows without sensors.

3. The apparatus of claim 2, wherein the regular number is one.

4. The apparatus of claim 2, wherein the regular number determines the number of concurrently selected rows.

5. The apparatus of claim 1, wherein the sensor elements are distributed substantially evenly over a matrix formed by the rows and columns.

6. The apparatus of claim 1, wherein each sensor element is offset one row and one column from at least one other sensor element.

7. The apparatus of claim 1, wherein two corner sensor elements are offset from only one sensor element by one row and one column, wherein edge sensor elements are offset from each of only two sensor elements by one row and one column and wherein the other sensor elements are offset from each of at least two sensor elements by one row and one column.

8. The apparatus of claim 1, wherein each row is referenced with a unique index i which increases by one for each successive row, wherein each column is referenced with a unique index j which increases by one for each successive column and wherein a sensor element is positioned at a row indexed by [N*m +offset(j) ] modulo M where M is the number of rows, N is the periodicity of the sensors within the columns and where m=0, 1, 2, 3.

9. The apparatus of claim 8, wherein for every N adjacent rows, the offsets(j) have N different values for offset(j) modulo N.

10. The apparatus of claim 8, wherein offset (j) is j.

11. The apparatus of claim 1, wherein the sensor elements are distributed such that, for each row the columns with sensors are separated by a regular number of columns without sensors.

12. The apparatus of claim 1, wherein the sensor elements are distributed such that, for each row the columns with sensors are separated by a regularly variable number of columns without sensors.

13. The apparatus of claim 1, wherein the concurrently selected rows have separations between them that vary with each successive concurrent selection in a series of concurrent selections.

14. The apparatus of claim 1, wherein different pairs of rows are concurrently selected in series, and wherein the series for one row in the pair is defined by a first series of rows that starts with the first row and ends with the last but one row and the series for the other row in the pair is defined by a second series of rows that starts with the last row and ends with the second row.

15. A method comprising:
a) concurrently selecting two or more rows in a matrix sensor comprising sensors disposed at intersections of a plurality of rows and a plurality of columns of the matrix sensor, from an available array of elements of the matrix sensor, wherein the available array includes at least one column in which at least two or more sensors are disposed in different rows, wherein specification of the two or more rows comprises specifying the rows of sensors such that no column in the matrix sensor includes two or more sensors specified rows of sensors; and b) simultaneously reading columns of the matrix sensor during a concurrent selection of rows so as to detect sensing events at two or more sensors disposed in the selected rows.

16. The method of claim 15, wherein sensing elements associated with the same column are not concurrently selected.

17. The method of claim 15, wherein each sensor element is associated with a unique combination of a row and a column of the sensor network but not every unique combination of row and column is associated with a sensor.

18. The method of claim 15, wherein the concurrently selected rows have separations between them that vary with each successive concurrent selection in a series of concurrent selections.

19. An apparatus comprising:
 a sensor network comprising: a plurality of rows, a plurality of columns and a plurality of sensor elements wherein each sensor element is associated with a unique combination of a row and a column but not every unique combination of row and column is associated with a sensor;
 selection circuitry configured to specify for concurrent selection, from an available array of elements of the sensor network, including at least one column in which two or more sensors are disposed in different rows, two or more rows according to predetermined patterns, wherein specification of two or more rows comprises specifying the rows of sensors such that no column in the sensor network includes two or more sensors specified rows of sensors;
 concurrently select the specified rows; and
 reading circuitry configured to concurrently read columns during a concurrent selection of rows so as to detect sensing events at sensors disposed in the selected rows.

* * * * *

UNITED STATES PATENT AND TRADEMARK OFFICE
CERTIFICATE OF CORRECTION

PATENT NO. : 9,575,580 B2  Page 1 of 1
APPLICATION NO. : 13/511976
DATED : February 21, 2017
INVENTOR(S) : Nurmi It is certified that error appears in the above-identified patent and that said Letters Patent is hereby corrected as shown below:

In the Claims

Claim 1, Column 8, Line 1 "comment" should be deleted and --concurrent-- should be inserted.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*